United States Patent [19]

Swami et al.

[11] Patent Number: 5,845,113

[45] Date of Patent: Dec. 1, 1998

[54] METHOD FOR EXTERNAL SORTING IN SHARED-NOTHING PARALLEL ARCHITECTURES

[75] Inventors: Arun N. Swami; Honesty C. Young, both of San Jose, Calif.

[73] Assignee: International Business Machines Corporation, Armonk, N.Y.

[21] Appl. No.: 967,594

[22] Filed: Oct. 27, 1992

[51] Int. Cl.[6] .............................. G06F 17/30; G06F 7/00; G06F 15/16

[52] U.S. Cl. .................... 395/607; 395/800; 395/200.15; 364/229.9; 364/228.3; 364/DIG. 1

[58] Field of Search .............................. 395/600, 200.15, 395/800; 364/222.9, 228.3

[56] References Cited

U.S. PATENT DOCUMENTS

| | | | |
|---|---|---|---|
| 4,210,961 | 7/1980 | Whitlow et al. | 364/300 |
| 4,520,456 | 5/1985 | Miranker et al. | 364/900 |
| 4,559,612 | 12/1985 | Vrielink | 364/900 |
| 4,567,572 | 1/1986 | Morris et al. | 395/860 |
| 4,575,798 | 3/1986 | Lindstrom et al. | 395/600 |
| 4,595,995 | 6/1986 | Alles | 364/900 |
| 4,766,534 | 8/1988 | DeBenedictis | 395/200.14 |
| 4,799,152 | 1/1989 | Chuang et al. | 395/800 |
| 4,809,214 | 2/1989 | Shimakura | 364/900 |
| 5,086,408 | 2/1992 | Sakata | 395/600 |
| 5,146,590 | 9/1992 | Lorie et al. | 395/600 |
| 5,179,699 | 1/1993 | Iyer et al. | 395/650 |

FOREIGN PATENT DOCUMENTS

| | | |
|---|---|---|
| 64-78369 | 3/1989 | Japan . |
| 2235798 | 3/1991 | United Kingdom . |

OTHER PUBLICATIONS

Iyer et al, "System Issues in Parallel Sorting for Database Systems" 1990 6th Int'l Conf. Data Engineering, IEEE, pp. 246–255, 1990.

A. C. McKellar, Sort Process, Defense Publication T913, 007, Published Aug. 14, 1973.

B. T. Bennett et al., Sort Process, Defense Publication T921,028, Apr. 23, 1974.

W. M. Conner II, Sorting Method, Defense Publication T920,010, Published Mar. 5, 1974.

R. A. Lorie and H. C. Young, A Low Communication Sort Algorithm for a Parallel Database Machine, Proceedings of the Fifteenth International Conf. on Very Large Data Bases, Amsterdam, Aug. 22–25, 1989, pp. 125–134.

(List continued on next page.)

Primary Examiner—Thomas G. Black
Assistant Examiner—Jack M. Choules
Attorney, Agent, or Firm—James C. Pintner; Philip E. Blair

[57] ABSTRACT

A system and method is provided for distributed relational databases for parallel sorting of a relation wherein the relation is a set of tuples to be sorted on multiple sort sites which completely decouples the return phase from the sort phase in order to eliminate the merge phase. The method involves selecting one coordinator site from any of the available logical sites, then generating and sorting a local sample on each of the available storage sites before sending the local random sample from each storage site to the designated coordinator site wherein the local random samples are merged to provide a single global sample. The coordinator site determines the global interval key values based on the global sample. The interval key values being determined such that each interval fits in a single sort site's main memory, wherein the tuples between two interval key values define the interval. The interval key values are sent to the various storage sites wherein each storage site scans its portion of the relation in order to determine for each tuple the assigned interval and its corresponding sort site before sending each tuple to the assigned sort site. At each sort site the tuples are stored in temporary files using a single temporary file for each interval whereafter repeating, for each interval on each sort site, the steps of reading an interval and performing an in-memory sort in any fashion of the interval read before sending the tuples of the sorted interval to the sink site.

39 Claims, 3 Drawing Sheets

OTHER PUBLICATIONS

D. J. DeWitt, J. F. Naughton, and D. A. Schneider, Parallel Sorting on a Shared–Nothing–Architectures Using Probabilistic Splitting, 1st International Conf. on Parallel & Dist. Infor. Sys., Dec. 4–6, 1992, Florida, pp. 280–291.

J. L. Wolf, D. M. Dias and P. S. Yu, Using a Surrogate Median to Speed the Execution of a Parallel Sort Merge Join Algorithm, IBM–Tech. Disclosure Bulletin, vol. 33, No. 9, pp. 215–217, Feb. 1991.

D. M. Dias, B. R. Iyer, J. L. Wolf and P. S. Yu, Methods for Improving the Efficiency of Parallel Sort Merge Joins in the Presence of Data Skew, IBM–Technical Disclosure Bulletin, vol. 33, No. 10A, pp. 166–170, Mar. 1991.

C. C. Douglas and W. L. Miranker, Aggregation Sorting, IBM Technical Disclosure Bulletin, vol. 32, No. 12, pp. 230–237, May 1990.

Salzberg et al., FastSort: A Distributed Single–Input Single––Output External Sort, Proceedings of the 16th International Conference on VLDB, pp. 94–101, Aug. 1990. (SIGMOD Record, vol. 19, Issue 2, Jun. 1990).

Beck et al., Sorting Large Files on a Backend Multiprocessor, IEEE Transactions on Computers, 37(7):769–778, Jul. 1990.

METHOD FOR EXTERNAL SORTING IN SHARED-NOTHING PARALLEL ARCHITECTURES

FIELD OF THE INVENTION

Broadly conceived, the present invention relates to methods for parallel sorting on databases, and in particular, to methods for parallel external sorting for relational databases on shared-nothing (message-passing) architectures.

BACKGROUND HISTORY

In the field of database management, parallel architectures often have a plurality of logical sites, that perform various functions. One or more logical sites, for instance, are designated as the coordinator sites that have the function of making global decisions across the database network of sites. The coordinator site oversees the coordination of activity between the various sites across the database network. One or more other logical sites that store the base relations are called the storage sites. Data originates from the storage sites and are sent across the network to the sort sites wherein the data are sorted. In some cases, the base relations are stored on logical sites called the initial sites. The data are sent from the initial sites to the storage sites so that the data is distributed uniformly across the storage sites. Sort sites have the function of generating sorted runs. After the sort sites have finished sorting their respective data segments, the individual sorted sections are sent to the merge sites wherein the data segments are reassembled and forwarded to the sink site collecting the composite result. A sink site has the function of gathering the results.

The sort operation is an important and expensive operation to perform in that it requires a lot of resources collectively engaged in the sorting procedure. In order to reassemble the large blocks of data in the minimum time, parallelizing the sort is essential. Further, the entire execution time of the sort operation depends on the level of achievable parallelism in the phases of the sorting operation, the amount of resources used by the various sites, and the degree of data skew.

Different algorithms can be used to perform the parallel sort operation, several of which have been proposed for the shared-nothing architecture. In a distributed memory or shared-nothing architecture, each node consists of one or more general purpose processors which communicate via message passing. The database system is implemented on a multiprocessor in which each processor has its own local memory and disk storage unit. The communication between processors must take place through an interconnection network.

The parallel sort operation consists of scanning, sorting, merging, and sending. During the scan phase the base relation on each storage site is scanned. The sort phase consists or generating the sorted runs on each of the sort sites. The sorted runs are merged during the merge phase on each of the merge sites. The sending phase occurs when the sorted tuples are sent or returned to the sink site.

The prior art has developed sorting algorithms of varying levels of complexity. One sorting algorithm is Algorithm S for Simple as discussed in Salzberg et al., "FastSort: A Distributed Single-Input Single-Output External Sort", Proceedings of the 16th International Conference on VLDB, pp. 94–101, August 1990. Algorithm S does the scan, sort, and merge at the various storage sites and the sink site alone merges the individually sorted data information tuple streams from the storage sites. One problem with Algorithm S is that the merge operation is carried out at a single sink site which can easily and quickly become a bottleneck in the entire sort operation. This bottlenecking is a particular drawback in the case where the data skew is minimal and the sorted tuples are sent to the sink site at a relatively high rate. Although this algorithm is simple and sends each tuple only once across the network effectively from the storage sites to the sink site, it has the disadvantage of having to sort before data re-distribution. Hence, it is vulnerable to any skew in the distribution of the stored data. It also does not scale well with increasingly large data sets because of the propensity to bottleneck at the sink site, and it performs a comparison-based merge operation at the sink site, which degrades overall performance.

Another sort algorithm is Algorithm MT for Merge-Tree described in Beck et al., "Sorting Large Files on a Backend Multiprocessor", IEEE Transactions on Computers, 37(7) :769–779, July 1990. Algorithm MT has the storage sites perform the local sort and the merge sites logically organized into a multi-level merge tree configuration. One disadvantage is that the number of times the tuples are sent over the network is one more than the depth of the merge tree because the merge sites are organized into multiple levels. For example, in a network having 128 merge sites organized as a binary tree each tuple is sent over the network a total of 8 times. Since the merge phase is carried out in a pipelined fashion, the effective degree of parallelism for the merge/ return phase roughly equals the fan-in of the merge tree.

Further, Algorithm MT is typically more sensitive to base relation data skew than might be perceived, because there is no load balancing of the sort work at the storage sites. In addition, comparison-based merge is used at the sink site to reassemble the data. Data reassembly in in this fashion is better than Algorithm S because of the much smaller degree of fan-in of the merge tree. Another disadvantage is that the merge sites feeding the sink site have a propensity to become communication bound. This reduces overall database performance. A problem in the art has been with effectively returning the sorted intervals to the sink site at full communication bandwidth. Another problem has been with reducing the time to first tuple, i.e., the elapsed time to get the first tuple to the designated sink site, as opposed to the time to last tuple, i.e., the elapsed time to get the last tuple to the sink site.

Another parallel sorting algorithm is Algorithm SL for Site-List, described in Lorie et al., "A Low Communication Sort Algorithm for a Parallel Database Machine", Proceedings of the 15th International Conference on VLDB, pp. 125–134, August 1989. Algorithm SL is used at the sink site to determine from which tuple stream the next tuple is to be obtained. After the local sort, each storage site sends a local sample to the coordinator site. The coordinator determines the interval values based on the sort keys in the samples and sends them to the storage sites, so that the site lists are ordered and the sink site only needs to concatenate the different site lists. The storage sites then send the sort keys and the site identifier to the appropriate destination merge sites according to the interval key values provided by the coordinator. Finally, the storage sites send the sorted tuples to the sink site, and the merge sites send the site identifiers according to the corresponding sort key order to the sink site. The sink site uses the site identifiers in the site list as indices to get tuples from the sorted tuple streams sent from the storage sites in the correct sequence without doing any comparisons.

Algorithm SL exploits high degrees of parallelism during all phases and sends the full tuple only once over the network. However, it has drawbacks. First, a significant amount of work is done up front before the tuples are redistributed. Thus, the response times ire sensitive to the data skew at the storage sites. Second, it requires a mechanism to avoid intra-transaction self-deadlock, which adds path-length to the overall performance of the sort algorithm.

Another sort algorithm is Algorithm OP for Ordered-Partition, discussed in DeWitt et al., "Parallel Sorting on a Shared-Nothing Architecture Using Probabilistic Splitting", Proceedings of the First International Conference on Parallel and Distributed Information Systems, pp. 290–291, December 1991. All tuples are distributed into several intervals, and each sort site is responsible for sorting and merging the tuples in an interval. Hence, in algorithm OP, the sort sites and the merge sites are a sites. Algorithm OP uses the same number of intervals equal to the number of sort sites. One drawback is that there is no overlap during the return phase. Thus, when one sort site is sending tuples, the other sort sites are idle waiting their turn to send their tuples. Since each interval typically does not fit into a sort site's main memory, the tuples must be read from the disk and sent to the sink site. A problem in the art has been to achieve efficient execution without requiring disk I/O parallelism.

Depending on the resources available to a merge site and the methodology employed to carry out the merge and return phases, the merge and return phases on a merge site may be disk I/O bound, CPU bound, or communication port bandwidth bound. While one sort site is reading, sorting, merging, and sending tuples to the sink site, the next sort site can process tuples until its buffer for the sorted tuples to be sent is full. It then has to wait for its turn to send tuples to the sink site. Hence, the amount of overlap between two consecutive sort sites depends on how much of the interval to be sorted fits into the main memory of the sort sites. Low overlapping would occur if the interval size were significantly larger than the sites's main memory. Further, by combining disk I/O parallelism with aggressive data pre-fetch, the merge site may become CPU bound. When the merge phase becomes CPU bound, a merge site still needs to merge the local sorted runs and return the tuples to the sink site, whereas the sink site only needs to receive the sorted tuples.

A single CPU bound merge site is not enough to deliver tuples as fast as the sink node can consume them. For example, if each merge site must merge 64 local sorted runs, a merge site must make $\log_2 64$ comparisons in order to send a tuple to the sink site. On the other hand, the sink site just receives tuples from one merge site at a time. If the path length to send/receive a tuple is about the same as to compare two tuples, it takes approximately 7 CPU bound merge sites to make the sink site CPU bound. If the sink site is communication port bandwidth bound, it does not enhance efficiency to execute the sort operation in parallel. Therefore, another drawback to Algorithm OP is that the return phase is executed sequentially and may be limited by the I/O subsystem of each sort site. Since the tuples assigned to each sort site need not fit into the site's main memory, merging the tuples from the sorted runs and returning them to the sink site may well be limited by the I/O subsystem. Another problem in the art has been with managing memory so as to free up space to be able to use a variety of efficient in-memory sorting techniques which are generally much quicker to execute.

SUMMARY AND OBJECTS OF THE INVENTION

The present invention relates to a system and method for parallel external sorting for relational databases having shared-nothing architectures.

It is a primary object of the present invention to provide a parallel external sort algorithm that utilizes a user accessible parameter to tune the interval size to the memory size of the processors without incurring more than the minimum number of physical I/Os, thereby maximizing memory usage and increasing processor efficiency, and that completely decouples the return phase from the sort phase.

It is another primary object of the present invention to provide an algorithm that partitions the records to be sorted into more intervals than the number of processors available, that allows for an arbitrary number of intervals per sort site, and that assigns consecutive intervals to the sort sites in a round robin fashion.

It is a further object to provide an external parallel sort algorithm, wherein the combined I/O and CPU time to sort an interval is overlapped with the total time for returning one interval from each sort site to the sink site, thereby achieving a high degree of parallelism, such that the returning of sorted intervals to the single sink site can proceed at communication bandwidth, while other processors continue to sort the later intervals.

It is another object to provide an external parallel sort algorithm that does not require disk I/O parallelism for efficiency and that effectively utilizes pipelining to hide disk I/O time.

Briefly and to achieve the foregoing objects in accordance with the present invention as embodied and broadly described herein, a method for parallel sorting of a relation which is a set or tuples to be sorted on multiple sort sites is disclosed herein. The method involves selecting one coordinator site from any of the available logical sites, then generating and sorting a local sample on each of the available storage sites, then sending the local random sample from each storage site to the designated coordinator site, wherein the local random samples are merged to provide a single global sample. The coordinator site determines the global interval key values based on the global sample. The interval key values are determined such that each interval fits in a single sort site's main memory, wherein the tuples between two interval key values define the interval. The interval key values are sent to the various storage sites. Each storage site scans its portion of the relation in order to determine, for each tuple, the assigned interval and its corresponding sort site, before sending each tuple to the assigned sort site. At each sort site, the tuples are stored in temporary files using a single temporary file for each interval. For each interval on each sort site, the following steps are repeated: reading an interval, and performing an in-memory sort in any fashion of the interval read, before sending the tuples of the sorted interval to the sink site. The relations can be sorted by any of a variety of in-memory sorting techniques because of the efficient matching of the size of the interval and the memory capacity of a site's main memory.

It is therefore an advantage of the present invention to provide an external parallel sort algorithm that is simple in terms of coding and complexity, and that does not require data pre-fetch within a single process.

It is another advantage to distribute the tuples before applying a local sort by utilizing random sampling to determine the interval key values.

It is yet another advantage to have a parallel external sort algorithm that is independent of the sink site consuming rate, and which can take advantage of multi-processor nodes by assigning different intervals to processors within a single node.

It is another advantage to enable a single node to have one or more roles in the algorithm of the present invention, such as acting simultaneously or sequentially as a storage site, a sort site, and a coordinator site during the parallel sort operation.

It is yet another advantage to have an algorithm which is equally applicable for a database configuration having a plurality of logical sites designated as sink sites.

Additional objects and advantages of the present invention will be set forth in the description which follows, and in part will be obvious from the description, or may be learned by the practice of this invention. The objects and advantages of this invention as described herein may be realized and obtained by means particularly pointed out and distinctly claimed in the appended claims, taken in conjunction with the accompanying drawings and detailed specification.

DESCRIPTION OF THE DRAWINGS

In order that the manner in which the above-recited and other advantages and objects of the present invention are obtained, a more particular description of this invention, briefly described above, will be rendered by reference to a specific embodiment thereof, which is illustrated in the appended drawings. With the understanding that these drawings depict only a typical embodiment of the present invention, and are not therefore to be considered in any way limiting of its scope, this invention will be described and explained with additional specificity and detail through the use of the accompanying drawings, in which.

DETAILED DESCRIPTION OF THE PREFERRED EMBODIMENT

Figure 1:
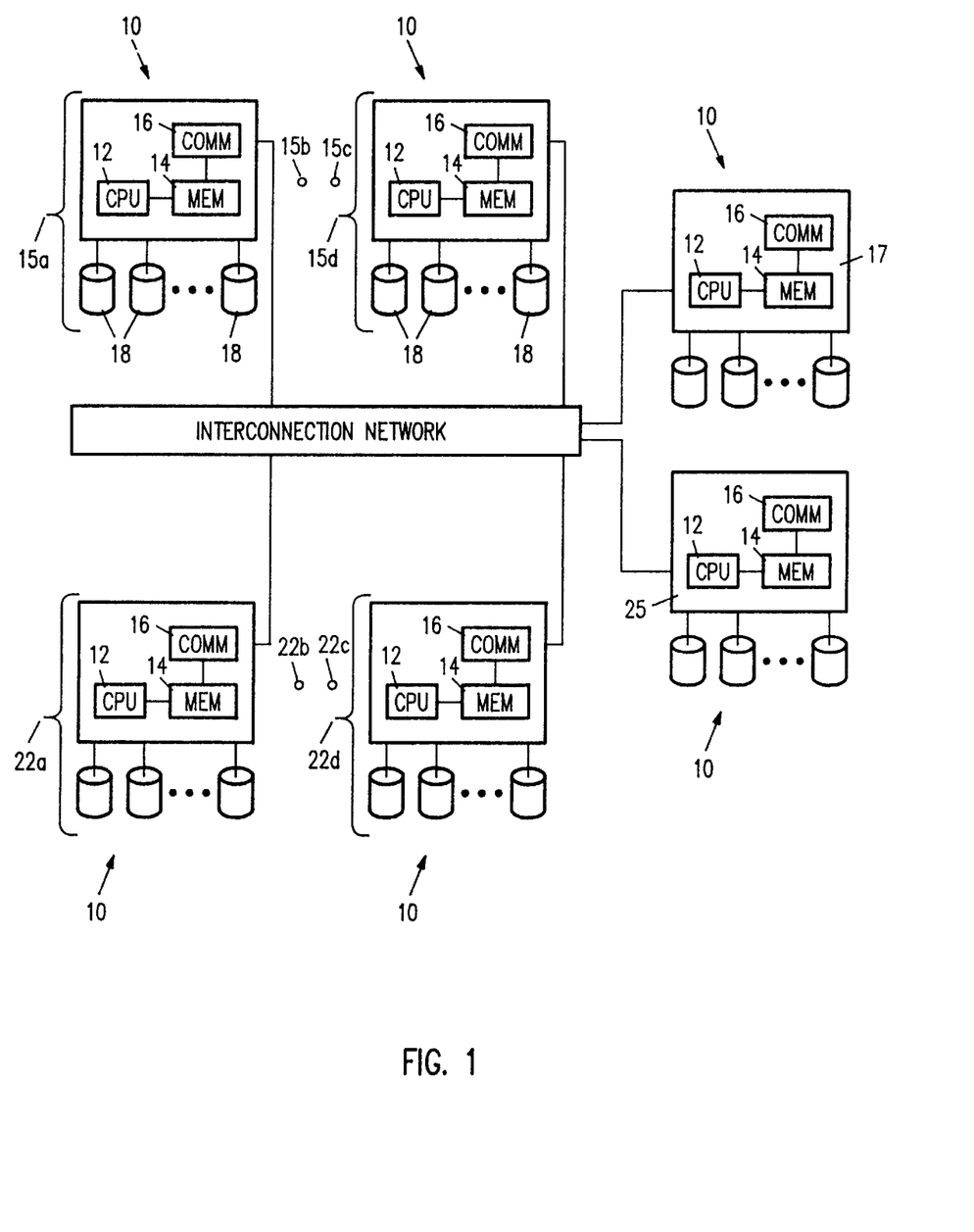
FIG. 1 is a generalized overview of a database having the shared-nothing distributed architecture generally having a plurality of storage sites, a plurality of sort sites, a coordinator site, and at least one sink site designated to receive the sorted data. Each logical site has a processor or CPU, local main memory, and a communication adaptor, wherein each site can communicate with other logical sites by an interconnection network.

With reference to FIG. 1, which is a generalized overview of a shared-nothing distributed architecture, the database is configured to have a plurality of logical sites, each generally designated as 10. Each logical site has a central processor unit 12 or CPU, a cache of local main memory 14, and a communication adaptor 16 through which the logical site communicates with the interconnection network 20. One or more disk drives, collectively designated as 18, are for local storage.

The configuration of FIG. 1 further illustrates a plurality of logical sites designated as storage sites 22. The storage sites act as mass storage units from which the data files to be sorted originate. More than one storage site may be required in very large database systems storing large volumes of data.

One logical site 17, would be designated as the coordinator site that would have the responsibility of making global decisions, such as in the present invention, determining the interval key values.

In the embodiment of the shared-nothing configuration of FIG. 1, logical sites, designated as 15, are sort sites. Each sort site generates the sorted runs from the data provided to it by the plurality of storage sites. A plurality of sort sites so designated can facilitate the sort operation much more quickly than the simple configuration of only a single sort site, because a fair degree of parallelism can he achieved by multiple sort sites operating simultaneously. It should be apparent that, the more logical sites in the database which are designated as sort sites, the more parallel sorting that can be accomplished.

The interconnection network 20 is also connected to at least one logical site which is designated as the sink site 25 that will be the receptacle of the sorted runs.

It should be apparent that the shared-nothing architecture can be characterized as having a plurality of logical sites 40, as shown, with all logical sites 10 in communication with other logical sites 10 over the interconnection network 20, and as and consisting of a plurality of nodes having one or more general purpose processors, wherein each node communicates via message passing.

A parallel sort algorithm generally consists of 4 phases: the scan phase wherein the base relation on each source or storage site is scanned; the sort phase wherein the sorted runs on each sort site are generated; the merge phase wherein the sorted runs on each sort site are merged; and the return phase wherein the merged tuples are sent to the sink site.

By way of analogous example and to help illustrate the 4 phase sort and the functions of the logical sites of FIG. 1, consider one database as having the job of keeping track of a base relation which, for example, may be all the pages in a large city phone book. Each name, address, and phone number that is stored in the database is a tuple, which is a term used to designate a packet of information. For illustrative purposes, assume that the tuples come from a very large base relation that is partitioned over multiple database storage sites.

A user query is entered in the database requesting all the names of all the people who have, for example, two consecutive number 4s in their phone number. It is requested that the answer to the database query be returned in alphabetic order. This database query may be the result of an SQL ORDERED BY clause, which is one of the more important cases for parallel sorting because all the qualifying tuples must be generated and then returned in some predetermined order.

A coordinator is selected from amongst the database logical sites. The coordinator site assigns to the various logical sites separate tasks to perform. For instance, the storage sites are utilized to scan the data and distribute that information to the sort sites. A group of sites are designated as sort sites whose task is to receive the data from the storage sites for local sorting. The coordinator site designates other sites as merge sites to collect the sorted data from amongst the various sort sites. The coordinator designates one site as the sink site that has the function of collecting the merged sorted data from the merge sites for presentation to the database user.

Once the network sites have received their respective designations, each wait for their task to begin. At the coordinator's signal, the storage sites begin gathering the stored data and distributing this data to the sort sites. In the present example, the storage sites distribute all information with consecutive number 4s in the phone numbers. One storage site distributes one tuple to one site then another tuple to the next sort site for sorting, and so on. Each storage site continues the data distribution process until all the data has been distributed to the sort sites. During the distribution process, all the sort sites are continuously engaged in locally sorting in a parallel fashion. Each sort site may be executing its own sorting technique. The sort sites continue to sort until data received from the storage sites has been sorted and no more data is distributed.

At the command of the coordinator, the merge site continuously collects the sorted data from the sort sites. To achieve the proper ordering, the merge site continuously asks the sort sites for the group of data in the next alphabetic sequence and collects that set of data from the sort site before asking for the next sequence. As the merge site merges the sorted data, the data gets sent to the sink site for collection. Once the merge site has merged all the sorted data from the sort sites, the sink site finishes collecting the data for presentation to the user and the database awaits further instruction.

The algorithm of the present invention, which is hereafter referred to as the RRP algorithm for Round Robin Partition, is equally applicable for a database configuration having a plurality of logical sites designated as sink sites, because the external sorting is independent of the sink site consuming rate. Further, a single node can have one or more roles in the RRP algorithm of the present invention, and such as, act simultaneously or sequentially as a storage site, a sort site, and a sink site during the parallel sorting operation. In such a fashion, the present algorithm can take advantage of multi-processor nodes by assigning different intervals to processors within a single node.

Figure 2:
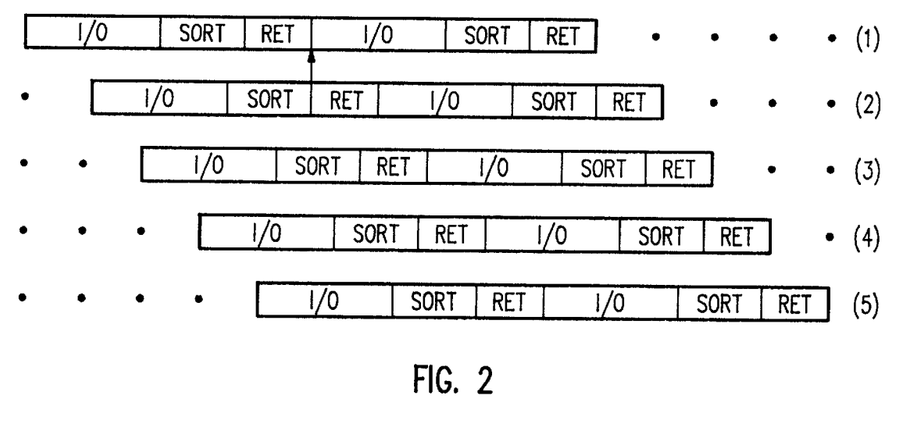
FIG. 2 is a diagram illustrating the overlapping of I/O, sorting and return times for each of the logical sites of FIG. 1 which are involved in parallel sorting.

The operation of the phases under the RRP algorithm is shown in FIG. 2, which is a diagram illustrating the overlapping of I/O, sorting and return times for each of the logical sites of FIG. 1 involved in the sorting. As the return phase of site (1) finishes, the return phase of site (2) begins. As the return phase of site (2) finishes, the return phase of site (3) begins, etc. In such a manner, the sink site is not idle waiting for a site to return its sorted runs. Algorithm RRP completely decouples the return phase from the sort phase. Further, because the combined I/O and CPU time to sort an interval is overlapped with the times for all other sort sites to return one interval from each sort site to the sink site, a high degree of parallelism is achieved. As a result, the returning of sorted intervals to the single sink site can proceed at communication bandwidth while other processors continue to sort the later intervals.

Figure 3:
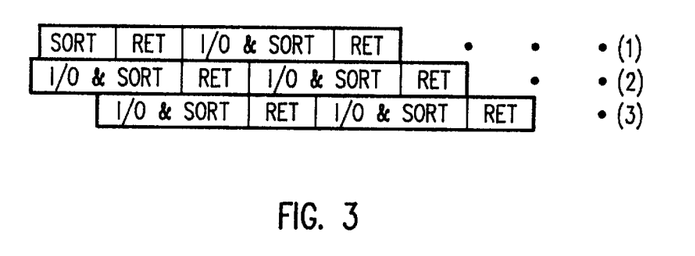
FIG. 3 is a diagram illustrating the overlapping of I/O, sorting and return times wherein a buffering scheme combines the I/O and sort phases for each logical site of FIG. 1 involved in parallel sorting.

With reference to FIG. 3, which is a diagram illustrating the overlapping of I/O, sorting and return times wherein a buffering scheme combines the I/O and sort phases for each of 3 sort sites of FIG. 1 involved in sorting to merge sorted runs and returning the tuples to the sink site. If the time to read and sort an interval is longer than the time to return an interval to the sink site by all other sites, double buffering can be used to overlap the I/O time of one interval with the sort and return times of the next interval on the same sort site. The overlap between two consecutive sort sites is from the initial reading and merging of sorted runs into a sort site's main memory. The percentage of overlapping depends on the ratio of the amount of main memory to any given interval size. Therefore, the time to first tuple, which is the time to get the first tuple to the sink site, is reduced by effectively utilizing smaller intervals which fit within main memory in order to enable the use of a variety of efficient in-memory sorting techniques. It should be apparent that since the first interval is not written to disk, it therefore does not need to be read from the disk before sorting. As a result, the time to first tuple can be reduced further since there is no I/O time for the first interval.

The RRP algorithm of the present invention is given in pseudocode herein. It is to be understood that the following can be implemented in a variety of different computer languages on differing system hosts. It should be further understood that the techniques disclosed herein are equally applicable for a database configuration having a plurality of logical sites designated as sink sites and the techniques disclosed herein for parallel sorting are applicable with other architectures wherein nodes may share disks and main memory with other nodes. Therefore, the following is not meant to be limiting but rather to be representative of the present method described and claimed.

---

Let sample_factor be used to determine the global_sample_size;
Let the number of sort sites be num_sort_sites;
Let the number of tuples in the relation be num_tuples;
Let the size of a tuple be tuple_size;
Let the size of local memory at a sort site be local_mem_size;
Let the minimum interval size be min_interval_size;
Let the number of intervals be num_intervals;
Let the time to read a size j interval be read_time$_j$;
Let the time to sort a size j interval in memory be sort_time$_j$;
Let time to send a size j interval to a sink he send_time$_j$;
Let the number of tuples on a storage site be num_tuples_on_this_site;
Let interval_factor be used to determine the initial number of intervals;
/* SET THE GLOBAL PARAMETER VALUES */
(1) Set: relation_size := num_tuples × tuple_size;
(2) Set: num_intervals := obtain_num_intervals(relation_size);
(3) Set: global_sample_size := sample_factor × num_intervals;
(4) Set: local_sample_factor := global_sample_size/num_tuples;
/* ON EACH_STORAGE SITE IN PARALLEL */
(5) Set: local_sample := generate_random_sample();
(6) Set: sorted_local_sample := sort(local_sample);
(7) send sorted_local_sample to the coordinator site;
/* ON THE COORDINATOR SITE */
(8) receive local samples from storage sites in set_of_local_samples;
(9) Set: global_sample := merge(set_of_local_samples);
(10) Set: interval_key_values := determine_intervals(global_sample);
(11) send interval_key_values to all storage sites;
/* ON EACH STORAGE SITE IN PARALLEL */
(12) receive interval_key_values from the coordinator site;
(13) for each tuple in a relation
(13a) Set: interval_num := search_intervals(interval_key_values, tuple);
(13b) Set: sort_site := interval_num MODULO num_sort_sites;
(13c) send the tuple to sort_site;
/* ON EACH SORT SITE IN PARALLEL */
(14) do until no more tuples from storage sites
(14a) receive a tuple;
(14b) store tuple in temporary file associated with the interval;
(15) for each temporary file
(15a) read in the temporary file into cur_interval;
(15b) Set: sorted_cur_interval := sort_in_memory(cur_interval);
(15c) send sorted_cur_interval to the sink site;
/* ON THE SINK SITE */
(16) Set: current_site := 0;
(17) for (i := 1; i ≤ num_intervals; i := i + 1)
(17a) read tuples of interval[i] from current_site;
(17b) Set: current_site := (current_site + 1) MODULO num_sort_sites;

---

In order to effectuate the implementation of the RRP algorithm some parameters must be defined. Any implementation of definition statements provided by the programming language of the database system will suffice. The Let statements are used to define values which are provided by the database system. The sample$_{13}$ factor is used to determine the global$_{13}$ sample$_{13}$ size. The number of sort sites is defined by num$_{13}$ sort$_{13}$ sites. This is given by the database configuration. The number of tuples in the relation is defined by num$_{13}$ tuples and the size of a tuple is given by tuple$_{13}$ size. The number of tuples on a particular storage site is num$_{13}$ tuples$_{13}$ on$_{13}$ this$_{13}$ site. The size of local memory at a sort site is defined by $local_{13}$ $mem_{13}$ size which is constrained by hardware configurations.

The time to process an interval, which corresponds to the startup overhead, must be kept small. In order to avoid making the intervals too small, which can result in excessive overhead, a minimum interval size, $min_{13}$ $interval_{13}$ size is required. For any given relation size, the minimum interval size dictates a maximum number of intervals.

The number of intervals denoted by $num_{13}$ intervals is additionally determined by the following two factors.

One factor is that each interval should be small enough so that it fits into a sort site's main memory with very high probability. If the tuples belonging to the same interval fit into a site's main memory then no I/O is involved during the return phase. This is achieved by the user adjustable parameter of the present invention, $interval_{13}$ factor, which determines the number of intervals. More specifically, it is used to tune the interval size to the memory size of the processors without incurring more than the minimum number of physical I/Os in order to maximize memory usage and increase processor efficiency. Each interval fits in the site's main memory, so that the tuples can be sent to the sink site from multiple sort sites in a pipelined fashion, thereby eliminating the merge phase, because a single sort site can deliver tuples as fast as the sink site can receive them. The algorithm of the present invention efficiently reduces the time to first tuple by utilizing these smaller intervals, and by advantageously remaining independent of the sink site consuming rate.

Another factor is that the time to read and sort an interval should be overlapped with the time to return an interval to the sink site by all other sites. The time to read and sort an interval should be less than the time for the other sites to each send the tuples in an interval to the sink site. It should also be appreciated that the use of one or more buffers can be used to hide the I/O and small variances in the interval size. If the sort site is running on a multi-processor node, each interval can be handled by a different task running on a separate processor. An optimization can be applied in that the first interval on each sort site can be kept in main memory to reduce the time.r of disk I/Os and response times. Algorithm RRP does not require disk I/O parallelism for efficiency because it effectively utilizes pipelining to hide disk I/O time.

Because only a very small percentage of tuples are actually extracted, the scan cost to obtain the local sample is cheaper than the normal scan to retrieve the tuples. If one is concerned about the I/O cost associated with sampling, one can sample at the page level though this may bias the sample.

The time to read an interval of size j is $read_{13}$ $time_j$. The time to send an interval of size j to a sink site is $send_{13}$ $time_j$ and the time to perform an in-memory sort of an interval of size j is $sort\_time_j$.

After the system parameters have been defined, LINES 1–6 initialize the RRP algorithm by making global assignments. In LINE 1, the $relation_{13}$ size is set equal to the number of tuples times the size of each tuple. This defines the size of the entire relation to be sorted. The $relation_{13}$ size is used to determine the $num_{13}$ intervals. that are distributed over the sort sites which is returned from the procedure $obtain_{13}$ $num_{13}$ intervals( ) in LINE 2. The $global_{13}$ $sample_{13}$ size is determined by multiplying the $sample_{13}$ factor by the $num_{13}$ intervals, in LINE 3, is used to determine the $local_{13}$ $sample_{13}$ factor. In LINE 4, the $local_{13}$ $sample_{13}$ factor is determined by dividing the $global_{13}$ $sample_{13}$ size by the $num_{13}$ tuples.

On each storage site, the $local_{13}$ sample must be determined by using the procedure $generate_{13}$ $random_{13}$ sample( ) which in turn defines the $sorted_{13}$ $local_{13}$ sample by the procedure sort( ). It should be understood that the sort( ) procedure is used only to sort the local samples and that any sorting algorithm common to the arts will suffice. Further, it should be appreciated that this sort routine is not necessarily limited nor restricted to an in-memory sort because the local samples may not fit in a storage site's memory (though typically the local sample will fit into a site's memory). Therefore, a pseudocode version of the procedure sort( ) of LINE 6 is not provided herein.

The generated value of the variable $sorted_{13}$ $local_{13}$ sample is then sent to the coordinator site, LINE 7, that is selected from any of the available logical sites to have the responsibility of making global decisions such as determining the interval key values.

The designated coordinator site receives the local samples from the storage sites, LINE 8, into the variable $set_{13}$ $of_{13}$ $local_{13}$ samples. The $global_{13}$ sample is assigned the value returned by the procedure merge( ) which merges the $set_{13}$ $of_{13}$ $local_{13}$ samples and returns the $global_{13}$ sample, LINE 9. The value of the $global_{13}$ sample. is thus obtained by selectively merging the local samples. The newly assigned value of the variable $global_{13}$ sample is then sent into the procedure $determine_{13}$ intervals( ) to determine the $interval_{13}$ $key_{13}$ values corresponding to the intervals, LINE 10. The key values being specifically determined such that each interval fits in a single sort site's main memory wherein the tuples between two global key values define the interval. Thus the coordinator site determines the global interval key values based on this global sample. This value is then sent to all the storage sites, LINE 11.

In a parallel fashion on each storage site, the $interval_{13}$ $key_{13}$ values are received from the coordinator site. The relation is then scanned. Each tuple is present in one of the intervals. For each tuple in the relation stored on a storage site the $interval_{13}$ num is assigned the value returned from the procedure $search_{13}$ intervals( ) given the $interval_{13}$ $key_{13}$ values and a tuple which locates the interval, LINE 13a. The RRP algorithm is not to be considered limited to any particular searching routine, rather, any search technique over an ordered table, for example, a binary search technique commonly found in the arts will suffice and therefore a pseudocode version of the procedure $search_{13}$ intervals( ) of LINE 13a is not provided.

The $sort_{13}$ site to which the tuple is to be sent is then obtained by a modulo operation on the corresponding interval number, LINE 13b. A modulo is a mathematical operation which returns the fractional portion of one integer number divided by another integer number. For example, 23 modulo 10 produces 3. The value of $sort_{13}$ site is determined by the value of the $interval_{13}$ num modulo $num_{13}$ $sort_{13}$ sites. This determines the site to which the tuple is to be sent. The tuples are then sent to the various sort sites by the storage sites according to their assignments, LINE 13c.

On each sort site in a parallel fashion, each tuple is received, LINE 14a, and then stored in a temporary file associated with the interval, LINE 14b, until no more tuples are received from the storage sites, LINE 14. At each sort site, the tuples are stored in temporary files for each interval, advantageously making access quicker and easier. For each temporary file thus created, LINE 15, the temporary file is read into the $cur_{13}$ interval, LINE 15a, and the $sorted_{13}$ $cur_{13}$ interval is set equal to the value returned by the procedure $sort_{13}$ $in_{13}$ memory( ) given the $cur_{13}$ interval, LINE 15b.

The relations can be sorted by an in-memory sorting technique because of the efficient matching of the interval and a site's main memory. The RRP algorithm is not to be considered limited to any particular in-memory sort routine, rather, any sorting method found in the arts will suffice.

Thus, each storage site's distributed relation is scanned to determine for each tuple the assigned interval and its corresponding sort site before sending each tuple to the assigned sort site. The $sorted_{13}$ $cur_{13}$ interval is then sent to the sink site, LINE 15c.

On the sink site, the sorted tuples are collected. In LINE 16, a local variable $current_{13}$ site is set equal to zero for use as an index into the sites. Then on LINE 17, for each interval of $num_{13}$ intervals the tuples belonging to the current interval are read from the current site, LINE 17a, and the next $current_{13}$ site is determined by incrementing the value of $current_{13}$ site modulo with the $num_{13}$ $sort_{13}$ sites, in LINE 17b.

The RRP algorithm is supported by the following procedures written in pseudocode. It should be understood that the following procedures are implementation specific and should be tailored as such.

be then determined by the average local memory size across all processors involved.

A local Boolean variable finished is set to the value of FALSE. Once these local variables have been initialized then while the local Boolean variable finished is still equal to the value of FALSE a series of logical tests are performed which, when completed, will set finished to the value of TRUE and break control of the WHILE LOOP. A temporary local variable $i_{13}$ size is assigned the value of the $num_{13}$ tuples divided by the value of the temporary local variable I and multiplied by the $tuple_{13}$ size.

In the first logical test, if the value of the temporary variable $i_{13}$ size is less-than or equal to the value of the globally defined $min_{13}$ $interval_{13}$ size then break control of the WHILE LOOP by assigning finished the value of TRUE because the interval should not be too small in order to avoid excess overhead. Otherwise, if the value of the globally defined $send_{13}$ $time_j$ multiplied by ($num_{13}$ $sort_{13}$ sites-1) is greater-than or equal to the value of $read_{13}$ $time_j$ plus the value of $sort_{13}$ $times_j$ then break control of the WHILE LOOP by assigning the temporary local Boolean variable finished equal to the value of TRUE because it is desirable to overlap the time to read and sort an interval with the time

```
/* DETERMINE NUMBER OF INTERVALS DISTRIBUTED ON SORT SITES */
(18) obtain_num_intervals(relation_size)
(18a) Set: I:=(relation_size/local_mem_size) × interval_factor;
(18b) Set: finished := FALSE;
(18c) while (finished = FALSE)
(18c1)    Set: i_size := (num_tuples/I) × tuple_size;
(18c2)    if (i_size ≤ min_interval_size)
(18c2a)       Set: finished := TRUE;
(18c3)    else if (send_timeⱼ × (num_sort_sites − 1)) ≧ (read_timeⱼ + sort_timesⱼ)
(18c3a)       Set: finished := TRUE;
(18c4)    else
(18c4a)       Set: I := I + num_sort_sites;
(19) return(I);
/* GENERATE THE RANDOM SAMPLE AT EACH STORAGE SITE */
(20) generate_random_sample()
(20a)    Set: local_sample := NULL;
(20b)    Set: local_sample_size := local_sample_factor × num_tuples_on_this_site;
(20c)    for (i := 1; i ≤ local_sample_size; i := i + 1)
(20c1)       Set: k := random() × num_tuples_on_this_site;
(20c2)       put tuple[k].key in local_sample;
(21) return(local_sample);
/* MERGE THE SAMPLES TO PRODUCE ONE GLOBAL SAMPLE */
(22) merge(set_of_samples);
(22a) Set: new_global_sample := NULL;
(22b) while (tuple in set_of_samples)
(22b1)    remove the smallest tuple among all samples;
(22b2)    append this tuple to new_global_sample;
(23) return(new_global_sample);
/* DETERMINE THE INTERVAL KEY VALUES FOR THE INTERVALS */
(24) determine_intervals(global_sample);
(24a) Set: temp_interval_size := global_sample_size/num_intervals;
(24b) Set: temp_interval_keys := NULL;
(24c) for (i. := temp_interval_size;
         i ≤ global_sample_size;
         i := i + temp_interval_size)
(24c1)    append global_sample[i] to temp_interval_keys;
(25) return(temp_interval_keys);
```

In LINES 18–19, the number of intervals that are distributed over the sort sites is returned by the procedure $obtain_{13}$ $num_{13}$ intervals( ) given the global parameter $relation_{13}$ size. A temporary local variable I is assigned the value of the $relation_{13}$ size divided by the $local_{13}$ $mem_{13}$ size and multiplied by the $interval_{13}$ factor to determine the initial number of intervals. In case the processors have local memory sizes of differing size, the interval sizes can be made proportional to the local memory sizes by the use of a variable $loc_{13}$ $mem_{13}$ $size_j$ and the number of intervals can to send an interval from all other sites. If neither of these two conditions have been met then the value of the two temporary local variables I and J are reassigned. The new value of I becomes equal to the old value of I plus the value of $num_{13}$ $sort_{13}$ sites, LINE 18c4a, which is the new number of intervals. When the control of the WHILE LOOP terminated by the changing of the Boolean value of the finished variable equals the value of TRUE, the procedure returns the value of I in LINE 19, which is the number of intervals distributed over the sort sites.

The procedure generate$_{13}$ random$_{13}$ sample( ) returns a local sample. In LINE 20a, the variable local$_{13}$ sample is initialized by assigning to it an empty value. The local$_{13}$ sample$_{13}$ size is then assigned the value of the local$_{13}$ sample$_{13}$ factor multiplied by the value of num$_{13}$ tuples$_{13}$ on$_{13}$ this$_{13}$ site, LINE 20b. This produces the number of samples to be taken. Then, in LINE 20c, for each local sample a temporary variable k is assigned the value returned by a random generator function random( ) multiplied by the value of num$_{13}$ tuples$_{13}$ on$_{13}$ this$_{13}$ site, LINE 20c1, which produces the index of the next tuple to be picked. The procedure random( ) returns a real value between 0 and 1. In LINE 20c2, the corresponding tuple key value is placed into the local$_{13}$ sample before being returned, LINE 21. It should be understood that the above is not limited to any one particular random sampling technique, rather, any known random sampling method found in the art will suffice.

In LINES 22–23, the procedure merge( ) merges the samples from the storage sites by first initializing the temporary local variable new$_{13}$ global$_{13}$ sample to an empty value, LINE 22a. At this point, the local samples are already sorted. Thus, the merge is easily achieved by always picking the next smallest available key value from among all the samples until all the samples are empty. While there are still tuples in the set$_{13}$ of$_{13}$ samples received from the coordinator site call, LINE 22b, the smallest tuple is removed from the set of all samples, LINE 22b1, and appended to the new$_{13}$ global$_{13}$ sample, LINE 22b2. Once all the tuples in the set have been scanned, the new$_{13}$ global$_{13}$ sample is returned by the merge procedure in LINE 23.

In LINES 24–25, the procedure determine$_{13}$ intervals( ) determines the interval key values for the interval by initializing the local variable temp$_{13}$ interval$_{13}$ size to be equal to the global$_{13}$ sample$_{13}$ size divided by the num$_{13}$ intervals, LINE 24a, which establishes a temporary size for the interval. Another temporary local variable temp$_{13}$ interval$_{13}$ keys is initialized to an empty value, LINE 24b. Then for each individual interval of the global$_{13}$ sample$_{13}$ size, LINE 24c, the corresponding global$_{13}$ sample[i] is appended to the temp$_{13}$ interval$_{13}$ keys variable, LINE 24c1. Once all the respective global samples have been appended to the temporary interval key variable, the temporary value is returned by the procedure in LINE 25.

The above RRP algorithm is conservative on the number of comparisons done and the total number of comparisons done by the RRP algorithm is independent of the number of intervals.

In order to demonstrate the property of conservation of comparisons consider the following. Let R be the number of tuples. Let $\alpha$ be the number of intervals per sort site. Let $\alpha N_{srt}$ be the total number of intervals. The number of comparisons for each tuple before the tuple redistribution is $\log_2(\alpha N_{srt})$ to determine which interval this tuple belongs to. Assuming equal size intervals, each interval has $$\frac{R}{(\alpha N_{srt})}$$

tuples and the number of comparisons for each tuple to sort an interval is $$\log_2\left(\frac{R}{(\alpha N_{srt})}\right).$$

Thus, the total number of per tuple comparisons are $$\log_2(\alpha N_{srt}) + \log_2\left(\frac{R}{(\alpha N_{srt})}\right) = \log_2(R).$$

That is, the total number of comparisons is R $\log_2(R)$ regardless of the number of intervals per sort site. Furthermore, the more intervals per sort, that is when $\alpha$ is larger, the more comparisons are done at the storage sites.

It is preferable to use a set of nodes to perform the parallel sort operation. However, the degree of parallelism for the storage site, $N_{src}$, may be different from the degree of parallelism for the sort site, $N_{srt}$. It is desirable to do more work on the storage sites when there are more storage sites than sort sites and consume as little memory as possible. It is also desirable to do more work on the sort site when there are more sort sites than storage sites and the base relation distribution is skewed. An increase in the number of intervals results in more work being done on the storage sites. A decrease in the number of intervals results in more work being done on the sort sites. Thus, the number of intervals is a parameter which can be tuned based on the above-considerations.

Figure 4:
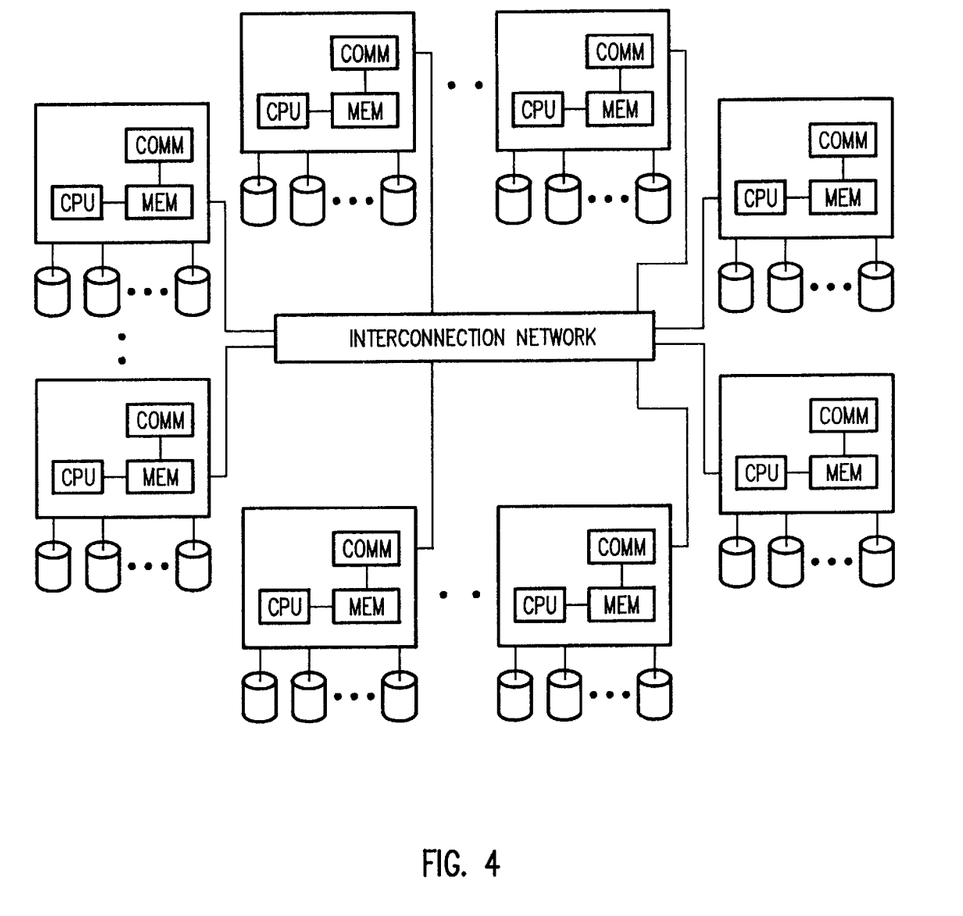
FIG. 4 is an modified version of FIG. 1 illustrating the addition of a set of initial sites distinct from the storage sites.

With reference now being made to FIG. 4, another embodiment of the RRP algorithm which is within the scope of the present invention is applicable to the embodiment of a distributed database which encompasses the use of a set of one or more initial sites, designated as 10, that are distinct from the storage sites 12 wherein the tuples are distributed. The tuples reside on a set of sites called initial sites. From the initial sites the tuples arc uniformly distributed to the storage sites. The initial sites are not to be considered limited to a uniform distribution, since the algorithm of the present invention is equally applicable to a random distribution to the storage sites. From that point on, all else is the same as in the RRP algorithm.

The following pseudocode helps facilitate an implementation of the uniform distribution to the storage sites. Again, it should be understood that the following is not meant to be limiting but rather to be representative of this embodiment wherein a set of initial sites are used.

```
/* ON EACH INITIAL SITE IN PARALLEL */
(26) Set: i := 1;
(27) for each tuple in the relation
 (27a)   Set: storage_site := i MODULO num_storage_sites;
 (27b)   Send the tuple to this storage_site;
 (27c)   i := i + 1;
```

In a parallel fashion on each initial site, an index i is initialized to 1 so that the storage sites can be indexed from the total number of storage sites, LINE 26. Then, for each tuple in the relation, LINE 27, to be the modulus of the index i with num$_{13}$ storage$_{13}$ sites to determine the correct storage site. Send the next tuple in the relation to that storage$_{13}$ site, in LINE 27b, and bump up the index i to the next value. In such a fashion, the tuples get distributed to the storage sites from the initial sites.

First the tuples are distributed uniformly to a different set of sites that runs on all nodes. The storage sites then determine the appropriate sort site of each tuple. In other words, the operations carried out in the initial sites in algorithm RRP are handled by the initial sites and all the storage sites in this embodiment.

Therefore, what is disclosed herein is a system and method for parallel external sorting for relational databases having shared-nothing architectures which completely decouples the return phase from the sort phase in order to eliminate the merge phase while being simple in terms of coding and complexity and which utilizes a novel user accessible parameter to tune the interval size to the memory size of the processors without incurring more overhead than is necessary to maximize memory usage and increasing processor efficiency. The records to be sorted are partitioned into more intervals than the number of processors available while allowing for an arbitrary number of intervals per sort site. The combined I/O and CPU time to sort an interval are overlapped with the times for all other sort sites to return one interval from each sort site to the sink site so as to achieve a high degree of parallelism such that the returning of sorted intervals to the single sink site can proceed at communication bandwidth while other processors continue to sort the later intervals, however, this does not require disk I/O parallelism for efficiency and instead effectively utilizes pipelining to hide disk I/O time.

This invention may be embodied in other specific forms without departing from its spirit or essential characteristics. The above-described embodiments of the present invention are to be considered in all respects only as illustrative and not restrictive in scope. The scope of the invention is, therefore, indicated by the appended claims rather than by the above-detailed description. Therefore, all changes which come within the meaning and range of equivalency of the claims are to be considered embraced within their scope.

What is claimed and desired to be secured by United States Letters Patent is:

1. A method for parallel sorting of a relation which is to be sorted on multiple sort sites and then sent to a single sink site, the relation including a plurality of tuples, the tuples being distributed over a plurality of storage sites, each sort site having at least a predetermined memory capacity, the method comprising the steps of:

determining a set of global interval key values and intervals therebetween, such that each interval fits in the predetermined memory capacity of a single sort site notwithstanding that the number of global interval key values might exceed the number of sort sites;

scanning at each storage site the relation distributed thereto, determining for each tuple an assigned interval and the corresponding sort site; and sending each tuple to the assigned sort site;

whereby the tuples are sorted over the sort sites.

2. A method as defined in claim 1 further comprising the step of determining the global interval key values based on a global sample of the tuples of the relation on the plurality of storage sites.

3. A method as defined in claim 1 further comprising the step of repeating for each interval on each sort site the steps of:

a) reading an interval;
   b) performing an in-memory sort in any fashion of the interval read; and
   c) sending the tuples of the sorted interval to the sink site.

4. A method as defined in claim 1 wherein the method steps of generating and sorting a local sample and sending the local random sample from each storage site to the designated coordinator site and merging the local random samples at one storage site proceed concurrently with the steps of generating and sorting a local sample and sending the local random sample from each storage site to the designated coordinator site and merging the local random samples at another storage site.

5. A method as defined in claim 1 wherein the sort site corresponding to an interval is determined in a round robin fashion.

6. A method as defined in claim 1 the steps off:

each sort site sorting one interval at a time, and storing the tuples at each sort site, in temporary files, using a single temporary file for each interval, prior to sorting the interval.

7. A method as defined in claim 6 wherein the method steps of reading, sorting, and sending the sorted tuples to the sink site proceed concurrently at different ones of the multiple sort sites.

8. A method as defined in claim 1 further comprising the step of selecting one of the multiple sort sites to serve as a coordinator site.

9. A method as defined in claim 8 further comprising the step of determining the global interval key values at the selected coordinator site and sending from the coordinator site the global interval key values to the storage sites.

10. A method as defined in claim 8 further comprising the steps of:

generating and sorting a local sample on each storage site;

sending a local random sample from each storage site to the selected coordinator site; and merging the local random samples on the designated coordinator site to provide a single global sample.

11. A method as defined in claim 10 wherein the method steps of generating and sorting a local sample and sending the local random sample from each storage site to the designated coordinator site and merging the local random samples on the designated coordinator site at one storage site, proceed concurrently with the steps of generating and sorting a local sample and sending the local random sample from each storage site to the designated coordinator site and merging the local random samples on the designated coordinator site at another storage site.

12. A method as defined in claim 1 wherein the set of tuples to be sorted are distributed from a set of initial sites to the storage sites.

13. A method as defined in claim 12 wherein the distribution of the tuples to the storage sites occurs in any fashion.

14. A method as defined in claim 13 wherein the distribution of the tuples to the storage sites occurs in a uniform fashion.

15. A method as defined in claim 13 wherein the distribution of the tuples to the storage sites occurs in a random fashion.

16. A computer program product for use in a node of a distributed database computer system having a plurality of nodes configured in a network, the nodes including a plurality of sort sites, each of the sort sites having a main memory, and each sort site having at least a predetermined memory capacity, for sorting of a relation wherein the relation is distributed over a plurality of storage sites and wherein the sorted relation is sent to a single sink site, the computer program product comprising:

a) a recording medium;
    b) means recorded on said medium for instructing the distributed database computer system to determine global interval key values such that each interval fits in the predetermined memory capacity of a single sort site, notwithstanding that the number of a global interval key values might exceed the number of sort sites, wherein the tuples between two global key values define an interval.

17. A computer program product as defined in claim 16 further comprising means, recorded on said medium, for instructing the distributed data base computer system to determine the global interval key values based on a global sample.

18. A computer program product as defined in claim 16 further comprising means, recorded on said medium, for instructing the distributed data base computer system to determine the global interval key values at the coordinator site and sending from the coordinator site the global interval key values to the storage sites.

19. A computer program product as defined in claim 16 further comprising means, recorded on said medium, for instructing the distributed data base computer system to repeat for each interval on each sort site the steps of:
 a) reading an interval;
 b) performing an in-memory sort in any fashion of the interval read; and
 c) sending the tuples of the sorted interval to the sink site.

20. A computer program product as defined in claim 16 further comprising means, recorded on said medium, for instructing the distributed data base computer system to select one coordinator site from any site.

21. A computer program product as defined in claim 20 further comprising means, recorded on said medium, for instructing the distributed data base computer system to generate and to sort a local sample on each storage site, to send the local random sample from each storage site to the selected coordinator site, and to merge the local random samples on the selected coordinator site to provide a single global sample.

22. A computer program product as defined in claim 16 wherein:
 each sort site includes means for storing one interval at a time; and
 the computer program product further comprises means, recorded on said medium, for instructing the distributed data base computer system to store the tuples at each sort site in temporary files using a single temporary file for each interval, prior to sorting the interval.

23. A computer program product as defined in claim 22 further comprising means, recorded on said medium, for instructing the distributed data base computer system to sort, and to send the sorted tuples to the sink site proceed concurrently at different ones of the storage sites.

24. A computer program product as defined in claim 16 further comprising means, recorded on said medium, for instructing the distributed data base computer system to scan at each storage site the relation distributed thereto and to determine for each tuple the assigned interval and the corresponding sort site and sending each tuple to the assigned sort site.

25. A computer program product as defined in claim 24 further comprising means, recorded on said medium, for instructing the distributed data base computer system to generate and to sort a local sample, to send the local random sample from each storage site to the designated coordinator site, and to merge the local random samples proceed concurrently at different ones of the storage sites.

26. A computer program product as defined in claim 24 further comprising means, recorded on said medium, for instructing the distributed data base computer system to send the global interval key values to the storage sites, to scan at each storage site the relation distributed thereto, to determine the assigned interval, and to store at each sort site the tuples in temporary files proceed concurrently at different ones of the storage sites.

27. A distributed relational database system for parallel sorting of a relation which is a set of tuples to be sorted on multiple sites, the system comprising:

a) an interconnection network;
b) one or more logical sites, each site having a least one processor with memory thereon in communication with the interconnection network, the logical sites including i) one or more storage sites, ii) two or more sort sites, each sort site having at least a predetermined memory capacity, iii) one or more sink sites, and iv) at least one coordinator site; and
c) an executable program for performing a parallel sort, comprising the steps of:
 determining global interval key values such that interval fits in the predetermined memory capacity of a single sort site, notwithstanding that the number of global interval key values might exceed the number of sort sites, wherein the tuples between two global key values define an interval,
 scanning the relation distributed to each storage site,
 determining for each tuple an assigned interval and a corresponding assigned sort site, and
 sending each tuple to the assigned sort site.

28. A system as defined in claim 27 wherein the executable program comprises the further step of determining the global interval key based on a global sample of the tuples of the relation on the plurality of storage sites.

29. A system as defined in claim 27 wherein the global interval key values are sent from the coordinator site to the storage sites.

30. A system as defined in claim 27 wherein the coordinator site is selected from among the multiple sort sites.

31. A system as defined in claim 30 wherein a local sample is generated and sorted on each storage site site, the local random sample is sent from each storage site to the selected coordinator site, and the local random samples are merged on the selected coordinator site to provide a single global sample.

32. A system as defined in claim 17 wherein, for each interval on each sort site, the executable program includes reading the interval, performing and an in-memory sort of the interval read, and sending the tuples of the sorted interval to the sink site.

33. A system as defined in claim 27 wherein the logical sites further comprise a set of initial sites wherein the set of tuples to he sorted initially reside.

34. A system as defined in claim 27 wherein the distribution of the tuples to the storage sites occurs in any fashion.

35. A system as defined in claim 17, further comprising:
 means, operable at each sort site, for sorting one interval at a time, and
 means for storing the tuples at each sort site in temporary files using a single temporary file for each interval, prior to sorting the interval.

36. A system as defined in claim 35, wherein the executable program steps of
 sending the assignment of intervals to the storage sites,
 scanning at each storage site the relation distributed thereto and determining
 the assigned interval, and
 storing at each sort site the tuples in temporary files at one storage site proceed concurrently with the executable program steps of
 sending assignment of intervals to the storage sites,
 scanning at each storage site the relation distributed thereto and determining
 the assigned interval, and
 storing at each sort site the tuples in temporary files at another storage site.

37. A sort node, for use in a distributed relational database, the distributed relational database having a plurality of nodes configured in a network, the network including a plurality of sort sites and a sink site, each of the sort sites corresponding with a respective interval, and each sort site having at least a predetermined memory capacity, the respective intervals being defined as falling between adjacent ones of a sequence of interval key values, the sort node comprising:

a) processor means for processing executable steps;

b) memory means, associated with said processor means, for storing data;

c) storage means for storing database information;

d) communication hardware means for enabling said sort node to communicate across said network;

e) means for receiving a set of global interval key values and intervals therebetween, such that a predetermined one of the intervals corresponds with said sort node and fits within the predetermined memory capacity of a respective one of the sort sites, notwithstanding that the number of a global interval key values might exceed the number of sort sites;

f) means for storing tuples in temporary files at said sort node; and g) means for repeating, for each interval on each of the sort sites, the executable steps of:
1) reading an interval;
2) performing an in-memory sort of the tuples stored, for the internal read; and
3) sending the tuples of the sorted interval to the sink site.

38. A storage node, for use in a distributed relational database, the distributed relational database having a plurality of nodes configured in a network, the network including a designated coordinator site and a plurality of sort sites, each sort site having at least a predetermined memory capacity, the storage node comprising:

a) processor means for processing executable steps;

b) memory means, associated with said processor means, for storing data;

c) storage means for storing database information;

d) communication hardware means for enabling said storage node to communicate across said network, e) means for generating and sorting a local sample at said storage node;

f) means for sending the local random sample from said storage node to the designated coordinator site;

g) means for receiving a relation, the relation including a sequence of interval key values, intervals being defined between adjacent ones of the sequence of interval key values, such that each interval fits in the predetermined memory capacity of a single sort site, notwithstanding that the number of global interval key values might exceed the number of sort sites, each of the intervals corresponding with a respective one of the sort sites;

h) means for scanning the relation and for determining, for each of a set of tuples to be sorted, an interval within which the tuple falls, and the corresponding sort site; and i) means for sending each tuple to another site across said network.

39. A coordinator node, for use in a distributed relational database, the distributed relational database having a plurality of nodes configured in a network, the network including a plurality of other sites, the plurality of other sites including a plurality of sort sites, each of the sort sites having a main memory including at least a predetermined memory capacity, the coordinator node comprising:

a) processor means for processing executable steps;

b) memory means, associated with said processor means, for storing data;

c) storage means for storing database information;

d) communication hardware means for enabling said coordinator node to communicate across said network;

e) means for merging local random samples on said coordinator node to provide a single global sample;

f) means for determining a sequence of global key values such that the tuples between two adjacent ones of the sequence of global key values define a respective interval, and each respective interval fits in the predetermined memory capacity of a respective one of the sort sites, notwithstanding that the number of global interval key values might exceed the number of sort sites, and g) means for sending the global interval key values to the other sites across said network.

* * * * *